THIN FILM PARAMETRIC OSCILLATOR

Original Filed June 30, 1959 2 Sheets-Sheet 1

INVENTOR
PAUL E. STUCKERT
JACK G. HEWITT, JR.

BY [signature]
AGENT

United States Patent Office 3,493,779

Patented Feb. 3, 1970

3,493,779
THIN FILM PARAMETRIC OSCILLATOR

Paul E. Stuckert, Katonah, and Jack G. Hewitt, Jr., Croton-on-Hudson, N.Y., assignors to International Business Machines Corporation, New York, N.Y., a corporation of New York Continuation of application Ser. No. 823,909, June 30, 1959. This application May 17, 1968, Ser. No. 731,684
Int. Cl. H01f *27/42, 31/06, 35/00, 37/02*
U.S. Cl. 307—88 13 Claims

ABSTRACT OF THE DISCLOSURE

An anisotropic magnetic film element having an easy axis of magnetization and provided with means applying an alternating field thereto. A resonant circuit coupling said element provides output signals of a first phase when said element is storing a first stable state and of a second phase when said element is storing a second stable state.

This application is a continuing application of parent application Ser. No. 823,909, filed June 30, 1959, now abandoned, and relates to multipurpose magnetic devices and more specifically to a multipurpose device capable of being utilized in a variety of data handling circuits and systems wherein the basic structure employed in fabricating the device is a magnetic element capable of assuming different stable states of residual magnetization and of being switched from one state to another by rotational processes.

Magnetic elements capable of attaining different stable states of residual flux density and characterized by their ability to be switched from one to another stable state by rotational processes may be employed for constructing devices capable of being utilized to perform a multiplicity of operations. One type of element exhibiting the above characteristics is a magnetic thin film having a uniaxial anisotropy, i.e. an easy direction of magnetization. Elements employing magnetic thin film materials have been found to be excellent storage devices and due to their rotational switching characteristics allow interrogation of the state of the storage device by non-destructive read-out processes as disclosed in a copending application Ser. No. 784,367, filed Dec. 31, 1958, now Patent No. 3,126,529 and assigned to the same assignee. It has been found, however, that in fabricating the particular storage devices which utilize the magnetic thin film material, to assure interrogation in a non-destructive manner over many read cycles, rigorous manufacturing techniques are necessitated. For instance, the magnetic films should be fabricated in such a manner that they have a substantially smooth surface and edges with very small variation in the homogeneity of the material.

Accordingly, by employing the novel features of this invention an improved storage device capable of being non-destructively interrogated may be constructed which minimizes the above manufacturing difficulties. Further, the novel device of this invention may not only be utilized as a non-destructive storage device but as a multi-phase stable device finding use in carrier type data handling systems.

The novel device of this invention in constructed by employing a thin magnetic film element having a uniaxial anisotropy. An interrogate or carrier winding is inductively linked with the film to provide a field transverse to its easy axis and a control winding wound in quadrature with the interrogate winding having a capacitor connected in parallel therewith. The interrogate winding is energized by an alternating current source having a repetition frequency of $f_0$ and the capacitor is chosen to provide resonance at $2f_0$. Such a circuit structure causes the magnetization vector to oscillator about its stable state by virtue of the interrogate drive, and also provides a field parallel to the easy axis of the film by virtue of the resonant circuit provided by the control winding and the capacitor connected in parallel therewith. Provision of the induced field parallel to the easy axis of the film in combination with the interrogate alternating field transverse to the easy axis, allows non-destructive interrogation of memory devices fabricated with thin film elements which have minor inhomogeneities in their structure and whose edges are not substantially smooth. It is because of this induced parallel field employed in combination with the alternating transverse interrogate field, that use of film elements having varying homogeneity and surfaces which are not perfectly smooth may be utilized as memory devices capable of being repeatedly interrogated non-destructively. Further, since the interrogate winding may be energized by an alternating current, the voltage source may be considered as a carrier signal source and the device may then be utilized as a phase stable device due to the use of the control winding in combination with the capacitor which sets up a resonant circuit relationship as will be subsequently described in detail.

Accordingly, it is a prime object of this invention to provide a new multipurpose device.

Another object of this invention is to provide a new multipurpose device employing magnetic elements capable of attaining different stable states of magnetization and of being switched from one to another of these stable states by rotational processes.

A further object of this invention is to provide an improved binary memory device adaptable for use in non-destructive read-out memory systems.

Still another object of this invention is to provide a novel multiphase stable device.

The foregoing and other objects, features and advantages of the invention will be apparent from the following more particular description of preferred embodiments of the invention, as illustrated in the accompanying drawings.

Generally, magnetic material may be considered as containing a multiplicity of small magnetically saturated regions which are called domains. In demagnetized materials, these domains are randomly positioned such that the resultant magnetization of the specimen is zero. Movement of the domain may be accomplished by rotation and by domain wall motion. In rotation the magnetic vector which is representative of each domain within the material rotates similar to a compass needle. This type rotational mechanism provides very high switching speeds when switching from one to another stable magnetic state. Domain wall switching, on the other hand, is generally a slower process in which changes in magnetization occur by the growth of domains parallel to the applied field at the expense of domains oriented antiparallel to the applied field.

Certain elements exhibit the characteristic of uniaxial anistrophy wherein the magnetic moments in the material tend to line up along an easy axis of magnetization. This characteristic may be produced in thin films of magnetic material which are in the order of 100 to 12,000 angstroms in thickness, but it should be noted however that other forms of magnetic material, such as tapes and ferrites, in appropriate geometries, also exhibit this characteristic under certain conditions.

Figures 1, 2, 3:
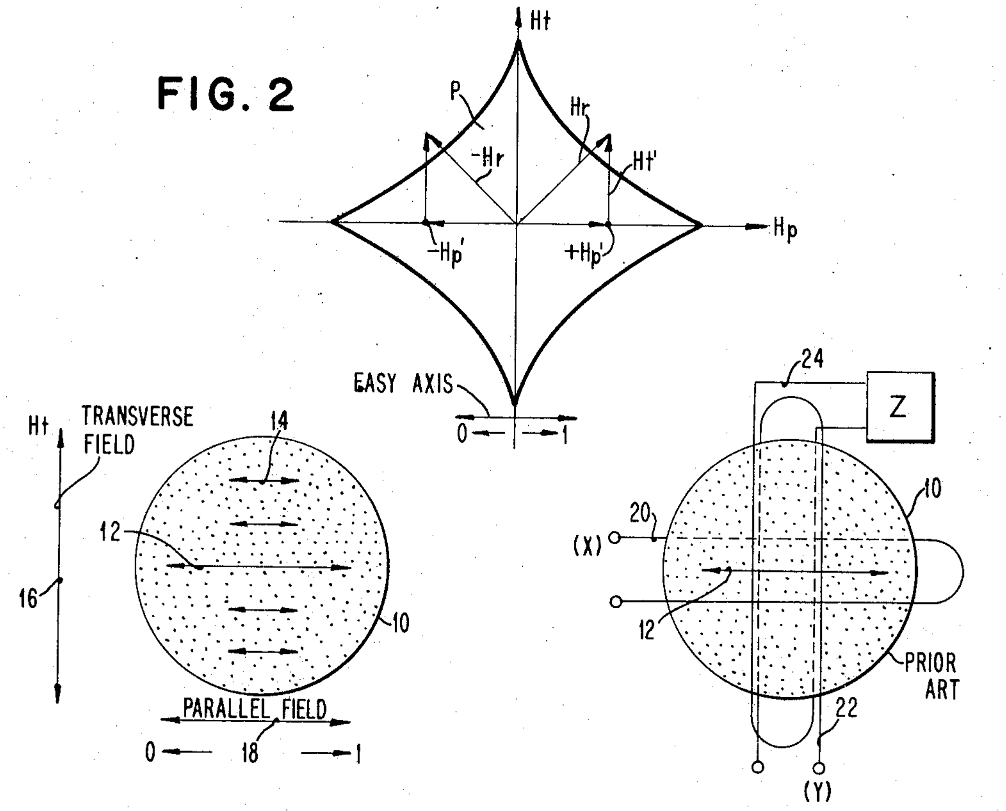
FIG. 1 illustrates a magnetic thin film element.
FIG. 2 is a plot of the rotational switching characteristics of the element of FIG. 1.
FIG. 3 is a circuit diagram of a typical binary memory element capable of being non-destructively read-out.

The preferred uniaxial anisotropic magnetic element employed in this invention is a thin magnetic film shaped in the form of a disk 10, as is shown in FIG. 1, having a composition of approximately 83% nickel and 17% iron. The material is evaporated or otherwise deposited by suitable means on a substrate, not shown, usually of glass, in a high vacuum ($10^{-6}$ mm. Hg), to a thickness of approximately 2,600 angstroms in the presence of a magnetic field such that the deposited material has a uniaxial anisotropic characteristic, i.e. a single axis of easy magnetization 12, along which magnetic moments 14 of the material tend to lie. The preferred direction of magnetization 12 of the film 10 is then the resultant direction along which all of the magnetic moments 14 within the film 10 tend to align themselves. A magnetic field which is applied transverse to the preferred or easy axis of magnetization 12 of the film 10 is represented by a double headed arrow 16 which may be symbolized by, and is hereinafter referred to as $H_t$. A transverse field, $H_t$, may be defined as a magnetic field applied in the plane of the film 10 in such a direction as to produce a field perpendicular to the easy axis 12 of the film 10. A magnetic field which is applied in the preferred direction of magnetization 12 of the film 10 is represented by a double headed arrow 18 which may be symbolized by, and is hereinafter referred to as $H_p$. A parallel field, $H_p$, may be defined as a magnetic field applied in the plane of the film 10 in such a direction as to produce a field parallel to the easy axis 12 of the film 10. It should be noted that both type fields, $H_t$ and $H_p$, may be applied in either direction as is indicated by the double headed arrows 16 and 18, respectively. In order to provide a designation for the directions of the resultant magnetization vectors which the film 10 may assume, the direction of the resultant magnetization vector from right to left is arbitrarily chosen as representing a binary 0, while the direction of the resultant magnetization vector from left to right is chosen as representing a binary 1, as indicated in the figure.

Switching the state of the film 10, which is in the 0 or 1 state, say from 1 to 0 state, may be accomplished by applying a field $H_t$ and $H_p$ in at least partial coincidence. The field $H_t$ applies a torque to all moments 14 within the element 10 to start rotation of the moments 14 in either the clockwise or counter-clockwise direction depending upon its direction. Under the influence of the field $H_t$, the moments 14 of the element 10 could rotate to a maximum of 90° with respect to the preferred direction of magnetization 12. With the combination of the field $H_p$ applied in coincidence with the field $H_t$, it may be seen that the moments 14 rotate toward the 0 state or from the 0 toward the 1 state depending upon the direction of the field $H_p$. The final state assumed by the element 10 upon removal of all fields, is then not dependent upon the direction of the applied field $H_t$, but is dependent upon the direction of the applied field $H_p$ and the moments 14 of the element 10 are rotated either clockwise or counter-clockwise, as a function of the initial state of the element and the direction of the applied transverse field $H_t$.

With reference to FIGS. 1 and 2, and more particularly to the FIG. 2, the switching characteristic of a magnetic material having properties that are similar to the element 10 of FIG. 1 is shown which comprises a plot of applied fields $H_t$ vs. $H_p$. The easy axis 12 of film 10 is shown to be parallel to the horizontal cordinate $H_p$ and the arbitrarily designated remanence directions of 0 and 1 are also indicated. The dark lines which intersect each of the coordinates traversing the different quadrants define the critical region of switching, in that within an area, labeled P, defined by the critical curves, there is no rotational switching of the moments 14, and without this area P, rotational switching of the moments 14 does occur. An applied field, $H_p$, of insufficient magnitude to cause switching of the element 10 from one stable state to another is designated by the points $+H_p'$ and $-H_p'$. If the field $+H_p'$ or $-H_p'$ were applied to a magnetic material having the switching characteristics defined in FIG. 2, reversal of the moments 14 within the material would take place in the presence of an additional field $H_t'$, of sufficient magnitude to place the resultant field vector outside the area P. Such a resultant vector is shown and labelled $+H_r$ and $-H_r$ in the FIG. 2. Further, it may be seen that if the magnitude of the field $H_p$ is decreased from the value $H_p'$, the magnitude of the field $H_t'$ must be increased in order to cause the resultant field vector $H_r$ to fall without the area P. It again should be noted that the transverse applied field, $H_t$, may have either polarity and in such a case the vectors illustrated in FIG. 2 would have a mirror image in the third and fourth quadrants.

With reference to the FIG. 3, the thin film element 10 is again shown with the easy axis of magnetization 12 having a winding 20, a winding 22, and a winding 24, inductively associated therewith. The winding 20 is wound in quadrature with the windings 22 and 24, and is adapted to apply a field transverse to the easy axis 12 of the film 10. The winding 22 is wound in quadrature to the easy axis 12 of the film and is adapted, when energized, to apply a field parallel to the easy axis 12 of the film 10. The windings 20 and 22 may be considered as coincident selection windings as utilized in normal coincident current memory matrices, while the winding 24 is utilized as an output winding connected with a load Z. The winding 20 is labelled X while the winding 22 is labelled Y to conform with the nomenclature utilized in normal coincident current selection schemes. The X winding, 20, is adapted to apply a field $H_t'$ while the Y winding, 22 is adapted to apply a field $+H_p'$ or $-H_p'$ depending upon whether a 0 or a 1 is to be stored. Consider, initially, that the X and Y windings are so energized as to switch the film element 10 to the 1 state of residual magnetization and it is desired to non-destructively read out the element to determine its state. The X winding 20 would then be energized to apply the field $H_t'$ and as may be perceived by reference to the FIG. 2, without the combination of the field $H_p$. The resultant vector $H_r$, therefore, is equal in magnitude to the applied field $H_t'$ and lies on the axis $H_t$, thus falling within the area P of the curves wherein no rotational switching takes place.

Figure 4:
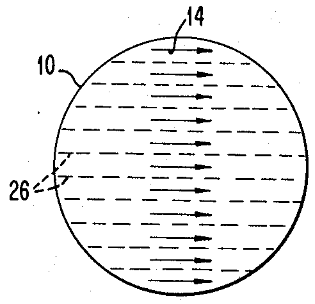
FIG. 4 is a descriptive representation of the domains as oriented in the magnetic material of FIG. 3.

Referring to the FIG. 4, the element 10 is shown divided into fictitious domains by dotted lines 26 each of which have a magnetic moment 14 as is shown in the FIG. 1. The moments 14 of the element 10 in the FIG. 4 are shown to be oriented in the 1 direction of magnetization as in the case as described above when non-destructive interrogation of the element 10 of the FIG. 3 is initiated.

Figure 5:
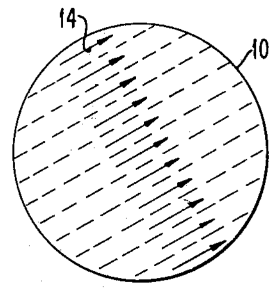
FIG. 5 is a descriptive representation of the domains when rotated in response to a small transverse magnetic field.

With reference to the FIG. 5, upon application of the applied field $H_t'$, both the fictitious domains and their corresponding moments 14 rotate counter-clockwise and, upon termination of the applied field $H_t'$, snap back to their normal position as is shown in the FIG. 4. Thus, a small induced voltage is provided on the output winding 24, and the state of the element 10 has not been destroyed.

The same type reasoning may be applied when the film 10 is in the 0 state, with the output voltage induced on the output winding 24 of opposite polarity.

Figure 6:
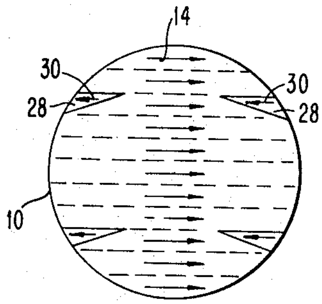
FIG. 6 is a descriptive representation of domain growth in the material utilized in the circuit of FIG. 3 after a number of interrogate fields are applied.
Figure 7:
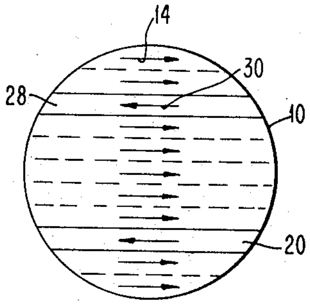
FIG. 7 is a descriptive representation of the domain structure within the material utilized in the circuit of FIG. 3 subsequent to a number of interrogations after that shown in the FIG. 6.

As is indicated, the structure of FIG. 3 is one which is utilized in the aforementioned copending application, and it has been found that unless, in the fabrication of the film elements utilized, the rigorous manufacturing techniques as described above are adhered to, after repeated interrogations of the film element 10 take place, small domains, such as shown in the FIG. 6 and labelled 28 start to form, having a moment 30 which is oppositely directed than the moments 14 which are directed toward the 0 state. After a time, the small domains 28 increase in size as is shown in the FIG. 7 and become proportionately larger. Thus, as the element 10 is interrogated over many cycles, a reduction in the overall magnetization of the element 10 occurs. This is due to the formation of domains such as 28, the magnetization of which are antiparallel to the original direction of magnetization as is illustrated by the moments 30 in distinction to the moments 14 in the FIGS. 6 and 7. Such antiparallel domain growth has been observed to be caused by discontinuities in the edge of the disk 10, inclusions in the material, or other minor inhomogeneities of the film.

Figure 8:
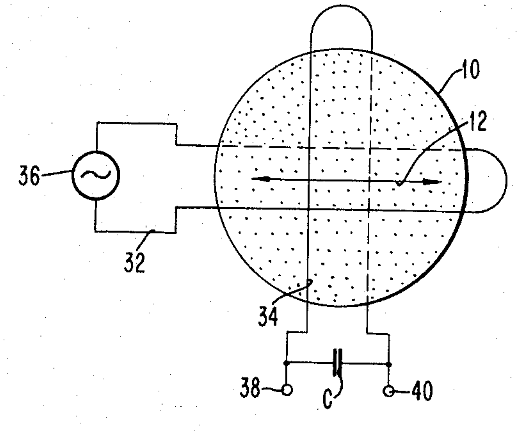
FIG. 8 is a circuit diagram of a novel multipurpose device in accordance with this invention.

Referring now to FIG. 8, a preferred embodiment of a multipurpose device in accordance with this invention is shown. Again the disk shaped thin magnetic film element 10 is shown having an easy axis of magnetization 12. Inductively associated with the element 10 is a carrier or drive winding 32 and a control winding 34, which is adapted to act as both an input and an output. The winding 32 is wound parallel to the axis 12 of the element 10 while the control winding 34 is wound in quadrature to both the carrier winding 32 and the easy axis 12 of the element 10. The carrier winding 32 is connected with a source generator 36 adapted to provide an alternating voltage at a frequency $f_0$, while the control winding 34 has a capacitor C connected in parallel therewith. The generator 36 is adapted to continuously energize the carrier winding 32 and apply a transverse field $H_t$ to the element 10 having maximum values substantially equal in magnitude to the field $H_t'$ shown in the FIG. 2. Since the generator 36 provides an alternating voltage, the field $H_t'$ would then have the maximum values $-H_t'$ and $+H_t'$ alternately. In order to fully explain the operation of the circuit of FIG. 8, the FIGS. 9 and 10 are shown which denote operation of the device of FIG. 8 when in the 0 and 1 stable state, respectively.

Figure 9:
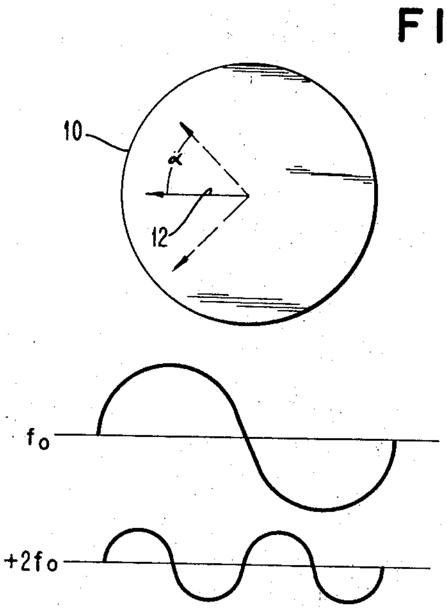
FIGS. 9 and 10 represent operation of the device of FIG. 8 in a first and a second stable state, respectively.
Figure 10:
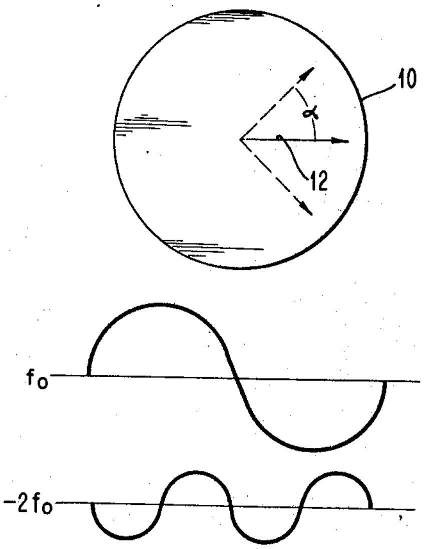

With reference to the FIGS. 8, 9 and 10, the applied field $H_t'$ due to the sinusoidal drive of the frequency $f_0$ from the source 36 causes the magnetization 12 of the element 10 to oscillate over a range indicated by dotted arrows in the FIGS. 9 and 10. An angle $\alpha$ is shown in the FIGS. 9 and 10 which indicates the peak excursion from the average direction which coincides with the drive current peaks. This oscillation about the average direction induces a voltage of twice the frequency of the drive signal ($2f_0$) in the control winding 34 which is tuned to resonance at $2f_0$ by the capacitor C. Indication of the state of the device is available at output terminals 38 and 40. The output signals obtainable from the device of FIG. 8 when in the 0 state is shown in the FIG. 9 and labelled $+2f_0$ as compared with the input carrier $f_0$. When the device of FIG. 8 is in the 1 state, the output signal obtainable at the terminals 38 and 40 of the control winding 34 is shown and labelled $-2f_0$ in the FIG. 10 also compared with the input carrier $f_0$. The outputs $+2f_0$ and $-2f_0$ defining the 0 and 1 state respectively of the device of FIG. 8 are seen to differ by a phase relationship of 180° and are continuously available.

More specifically, considering the condition when the device of FIG. 8 is in the 0 state, as is shown in FIG. 9, as the moments 14 of the element 10 are rotated clockwise by the applied field $H_t'$, a voltage is induced in the control winding 34 which charges the capacitor C. As the applied field $H_t'$ decays to reverse its direction, the capacitor C discharges causing a current flow in the control winding 34 which in turn provides a field parallel to the easy axis 12 of the element 10 and in the 0 direction. This parallel field, $H_p$, would then have a magnitude similar to the field $-H_p'$ as shown in the FIG. 2 and drives the moments 14 of the element 10 toward the relaxed position defined by the easy axis 12. At this point, the field $-H_t'$, khich is oppositely directed, would cause the magnetization of the element 10 to rotate to the extreme counter-clockwise direction and in so doing induce a voltage in the control winding 34 which charges the capacitor C in an opposite sense than the previous charge impressed thereon. Thus, as the carier $f_0$ continues, the capacitor C is charged and discharged as described above.

It may immediately become apparent that by utilizing a switch in series with the generator 36, the carrier winding 32 may serve as an interrogate winding as described above for the FIG. 3, and the state of the device of FIG. 8 may be interrogated by closure of the fictitious switch. Further, it should be observed that while both the devices of FIG. 3 and FIG. 8 utilize an applied transverse field, $H_t'$, the device of FIG. 8 also provides a parallel field by virtue of the induced current in the control winding 34. By the provision of this induced parallel field when interrogation takes place the domain growth shown in the FIGS. 6 and 7 does not occur since the parallel field reorients the moments 14 of each domain during each cycle of the interrogation current. Thus the structure of FIG. 8, allows construction of memory elements in non-destructive read-out memories with less rigorous fabrication techniques. To switch the device of FIG. 8 from one to another of its stable states input signals are directed to the terminals 38 and 40 of the control winding 34. With no signal applied to the winding 32, a current pulse applied to the winding 34 capable of producing a field $H_p$ whose magnitude is without the area P, with reference to the switching characteristic of FIG. 2, the direction of magnetization of the element 10 is reversed. With the winding 32 energized, a current pulse of somewhat smaller magnitude than that described above also causes the magnetization of the element 10 to be reversed. Further, with the winding 32 energized, a change in the stable state of the element 10 is produced by applying a sinusoidal current of the frequency $2f_0$ to the terminals 38 and 40 which is 180° out of phase with the output signal denoting its operating stable state as shown in the FIGS. 9 and 10. simply, with reference to the FIG. 9, a sinusoidal current of $-2f_0$ is applied to the terminals 38 and 40 to reverse the stable state of the element 10 and with reference to the FIG. 10 a sinusoidal current of $+2f_0$ is applied to the terminals 38 and 40 to reverse the stable state of the element 10. While switching is accomplished by providing signals to the terminals 38 and 40 of the control winding 34, it is apparent that the same signals may be applied to a further winding linking the element 10 wound in quadrature to the easy axis 12 similar to the winding 34. By virtue of the type outputs obtainable and the operational features above described for FIG. 8, this structure may also be made to operate as a multiphase stable device, that is, a device capable of attaining different stable states and providing output indications which are continuously available but differ from one another by a phase relationship.

While the invention has been particularly shown and described with reference to preferred embodiments thereof, it will be understood by those skilled in the art that the foregoing and other changes in form and details may be made therein without departing from the spirit and scope of the invention.

In the claims:

1. A device comprising:

(a) an anisotropic magnetic film element exhibiting an easy axis of magnetization defining different stable residual states;

(b) means for applying an alternating field to said element;

(c) and input-output reasonant circuit means coupling said element for providing a first output signal of a given phase when said element is in a first of said stable states and a second output signal of a different phase when said element is in a second of said stable states.

2. A circuit comprising:
(a) an anisotropic magnetic film element exhibiting an easy axis of magnetization:
(b) means for applying a varying field of given frequency to said element transverse to the easy axis thereof;
(c) and means coupling said element for developing a varying voltage in response to said applied field whose variation is a multiple of said given frequency.

3. A circuit comprising:
(a) a magnetic element exhibiting an easy axis of magnetization defining different stable states of flux remanence;
(b) means for applying a varying field to said element;
(c) and control means coupled to said element for both establishing said element in one of said stable states and developing a varying voltage of a phase dependent upon the stable state of said element in response to said applied field.

4. A circuit comprising:
(a) a magnetic film element exhibiting an easy axis of magnetization defining different stable states of flux remanence;
(b) means for applying a varying field to said element in a direction transverse to the easy axis thereof;
(c) and control means coupled to said element for both establishing said element in one of said stable states and developing a varying voltage of a phase dependent upon the stable state of said element in response to said applied field.

5. A circuit comprising:
(a) a magnetic thin film element defining a portion of a flux path only and exhibiting an easy axis of magnetization for different stable states of flux remanence;
(b) means for applying a varying field of given frequency to said element in a direction transverse to the easy axis thereof;
(c) and control means coupling said element for both establishing said element in one of said stable states and developing a varying voltage of predetermined phase and frequency, the frequency of said developed voltage being a multiple of said given frequency with the predetermined phase being dependent upon the stable state of said element.

6. A circuit comprising:
(a) a magnetic thin film element defining a portion of a flux path only and exhibiting an easy axis of magnetization for different stable states of flux remanence;
(b) a carrier winding coupling said element wound parallel to the easy axis thereof;
(c) means for energizing said carrier winding with a signal of frequency $f_0$;
(d) and input-output resonant circuit means coupling said element in quadrature to the easy axis thereof for both establishing said element in one of said stable states and developing a varying voltage of frequency $2f_0$ having a phase determined by the stable state of said element.

7. A parametric oscillator comprising:
(a) a capacitance,
(b) a time variable inductor including
(i) a single domain magnetic film
(ii) a pair of windings about said film, one of said windings extending parallel to the rest direction of film magnetization and constituting a pump field winding, the other of said windings extending generally perpendicularly to said pump field winding and constituting a signal field winding, and
(c) means for applying a voltage to said pump field winding, said means being variable to provide an additional stable state of oscillation.

8. A parametric oscillator comprising:
a time variable inductor including:
(a) a single domain magnetic film,
(b) a pair of windings about said film, one of said windings extending parallel to the rest direction of film magnetization and constituting a pump field winding, the other of said windings extending generally perpendicularly to said pump field winding and constituting a signal field winding;
(c) a capacitance coupled to said signal field winding
(d) means for applying a voltage to said pump field winding; and means coupled to said oscillator for providing an additional stable state of oscillation.

9. A bistable oscillator circuit having first and second stable stages of oscillation comprising:
(a) a thin film of magnetic material having an easy axis of magnetization;
(b) a pump field winding and a signal field winding on said element one of said windings extending parallel to the easy axis of said element and the other of said windings extending perpendicular to said easy axis;
(c) a capacitor coupled to said signal winding;
(d) means for applying a varying voltage to said pump field winding to cause said circuit to oscillate in either said first or said second stable state;
(e) and means coupled to said oscillator providing an output indicating whether said circuit is oscillating in said first or said second stable state.

10. A memory device comprising:
(a) an anisotropic thin film magnetic element exhibiting an easy axis of magnetization and capable of being caused to assume first and second different stable information representing states of flux orientation along the direction of said easy axis;
(b) control means including winding means on said element and energizing means coupled to said winding means for causing said element to assume either said first or second stable information representing state and for nondestructively interrogating said element to determine which stable state it is in;
(c) and said energizing means including means for nondestructively interrogating said element by applying an oscillatory signal at a given frequency to a first winding of said winding means on said element which applies an oscillatory field essentially perpendicular to said easy axis and causes to be induced on a second winding of said winding means on said element an oscillatory signal the phase of which indicates the stable state said element is in.

11. The device of claim 10 wherein said first winding is energized by an alternating signal of a frequency $f_0$ and the output signal on said second winding has a frequency $2f_0$.

12. The device of claim 11 including a capacitor connected in parallel with said second winding.

13. The device of claim 12 wherein said film is 2600 angstroms thick.

References Cited

UNITED STATES PATENTS

| | | | |
|---|---|---|---|
| 3,015,807 | 1/1962 | Pohm et al. | 340—174 |
| 3,030,612 | 4/1962 | Rubens et al. | 340—174 |
| 3,077,586 | 2/1963 | Ford | 340—174 |
| 3,092,812 | 6/1963 | Rossing et al. | 340—174 |

STANLEY M. URYNOWICZ, Jr., Primary Examiner